(12) United States Patent
Hidaka et al.

(10) Patent No.: US 10,385,863 B2
(45) Date of Patent: Aug. 20, 2019

(54) ROTOR

(71) Applicant: DENSO CORPORATION, Kariya, Aichi-pref. (JP)

(72) Inventors: Yuuji Hidaka, Kariya (JP); Masaya Ootake, Kariya (JP)

(73) Assignee: DENSO CORPORATION, Kariya (JP)

( * ) Notice: Subject to any disclaimer, the term of this patent is extended or adjusted under 35 U.S.C. 154(b) by 92 days.

(21) Appl. No.: 15/738,869

(22) PCT Filed: Jun. 21, 2016

(86) PCT No.: PCT/JP2016/002966
§ 371 (c)(1),
(2) Date: Dec. 21, 2017

(87) PCT Pub. No.: WO2016/208179
PCT Pub. Date: Dec. 29, 2016

(65) Prior Publication Data
US 2018/0195523 A1    Jul. 12, 2018

(30) Foreign Application Priority Data
Jun. 26, 2015   (JP) ................................ 2015-128500

(51) Int. Cl.
*H02K 1/28*   (2006.01)
*F04D 29/20*   (2006.01)
(Continued)

(52) U.S. Cl.
CPC ............ *F04D 29/20* (2013.01); *F02M 37/08* (2013.01); *F04D 3/005* (2013.01); *F04D 5/002* (2013.01);
(Continued)

(58) Field of Classification Search
CPC .. H02K 1/27; H02K 1/00; H02K 1/02; H02K 1/28; H02K 5/12; H02K 7/04; H02K 7/14;
(Continued)

(56) References Cited

U.S. PATENT DOCUMENTS 4,776,759 A * 10/1988 Maskell .............. F04D 29/5893
277/408
8,040,015 B2 * 10/2011 Zaps ...................... H02K 1/278
29/598

(Continued)

FOREIGN PATENT DOCUMENTS

JP    H02-103193    8/1990
JP    2002-305847   10/2002
(Continued)

*Primary Examiner* — Julio C. Gonzalez
*Assistant Examiner* — Leda T Pham
(74) *Attorney, Agent, or Firm* — Nixon & Vanderhye PC

(57) ABSTRACT

A rotor used for a motor that rotates an impeller of a fuel pump includes a cylindrical bonded magnet that forms a plurality of magnetic poles, an inner core that is a cylindrical component provided inward of the bonded magnet and that has both axial end surfaces exposed to outside, and a rotating shaft that includes a connecting end, which has a pair of flat surfaces parallel to each other and is fitted to the impeller, and that is provided to pass through the inner core inward thereof. A cross section of the connecting end has a centroid coinciding with a rotational axis.

3 Claims, 7 Drawing Sheets

(51) Int. Cl.

| | |
|---|---|
| *F02M 37/08* | (2006.01) |
| *H02K 1/22* | (2006.01) |
| *H02K 1/27* | (2006.01) |
| *H02K 7/14* | (2006.01) |
| *F04D 3/00* | (2006.01) |
| *F04D 5/00* | (2006.01) |
| *F04D 13/06* | (2006.01) |
| *F04D 29/043* | (2006.01) |
| *F04D 29/18* | (2006.01) |
| *F04D 29/52* | (2006.01) |
| *H02K 5/12* | (2006.01) |
| *H02K 7/04* | (2006.01) |

(52) U.S. Cl.
CPC ........... *F04D 13/06* (2013.01); *F04D 29/043* (2013.01); *F04D 29/181* (2013.01); *F04D 29/528* (2013.01); *H02K 1/22* (2013.01); *H02K 1/27* (2013.01); *H02K 1/2733* (2013.01); *H02K 5/12* (2013.01); *H02K 7/04* (2013.01); *H02K 7/14* (2013.01)

(58) Field of Classification Search
CPC .......... H01F 1/057; H01F 41/02; H01F 1/032; F04D 13/06; F04D 29/043; F04D 29/18; F04D 29/52; F04D 3/00; F04D 5/00
See application file for complete search history.

(56) References Cited

U.S. PATENT DOCUMENTS

| | | | |
|---|---|---|---|
| 9,130,426 B2* | 9/2015 | Song | H02K 1/278 |
| 2003/0173924 A1* | 9/2003 | Blase | F02M 37/08 |
| | | | 318/538 |
| 2008/0185930 A1* | 8/2008 | Ahrens | H02K 1/278 |
| | | | 310/156.08 |
| 2008/0296990 A1* | 12/2008 | Evans | H02K 1/276 |
| | | | 310/156.56 |
| 2016/0211719 A1 | 7/2016 | Hidaka et al. | |
| 2016/0238016 A1 | 8/2016 | Sakai et al. | |

FOREIGN PATENT DOCUMENTS

| | | |
|---|---|---|
| JP | 2005-295775 | 10/2005 |
| JP | 2010-11626 | 1/2010 |

* cited by examiner

ROTOR

CROSS REFERENCE TO RELATED APPLICATION

This application is the U.S. national phase of International Application No. PCT/JP2016/002966 filed Jun. 21, 2016 which designated the U.S. and claims priority to Japanese Patent Application No. 2015-128500 filed on Jun. 26, 2015, the entire contents of each of which are hereby incorporated herein by reference.

TECHNICAL FIELD

The present disclosure relates to a rotor used in a motor that drives an impeller of a fuel pump.

BACKGROUND ART

In a known fuel pump, an impeller in a casing is rotationally driven by a motor to feed a fuel under pressure. In a fuel pump disclosed in Patent Document 1, a rotor of a motor is made up of a rotating shaft, an inner core to be fitted on the rotating shaft, and a bonded magnet covering the periphery of the inner core. The bonded magnet includes, for example, a neodymium bonded magnet, and has a cylindrical part, a top plate closing the two ends of the cylindrical part, and a bottom plate. While a D-shape of a cross section of an end of the rotating shaft may be accompanied with loss of dynamic balance of a rotor, such loss of dynamic balance is corrected by a recess or a protrusion of each of the top plate and the bottom plate.

PRIOR ART DOCUMENT

Patent Document

Patent Document 1: JP2015-50805A

In Patent Document 1, volume of the bonded magnet is decreased by providing the inner core. This decreases the used amount of a material such as a rare earth metal constituting the bonded magnet. On the other hand, the rarity of such a material has been increasing more and more along with a recent demand increase, and thus a further decrease in volume of the bonded magnet is required to decrease the amount of material used as much as possible.

On the other hand, since the cylindrical portion forming the magnetic pole of the rotor cannot be reduced, the top plate and the bottom plate are probably reduced. However, if the top plate and the bottom plate are reduced, the dynamic balance cannot be corrected. If the recess or the like to correct the dynamic balance is provided at the end of the cylindrical portion, thickness of the cylindrical portion must be increased contrary to the reduction in volume of the bonded magnet.

SUMMARY OF INVENTION

The present disclosure addresses the above issues. Thus, it is an objective of the present disclosure to provide a rotor, in which volume of a bonded magnet is decreased while dynamic balance is prevented from being lost.

To achieve the objective, a rotor in an aspect of the present disclosure is used for a motor that rotates an impeller of a fuel pump. The rotor includes a cylindrical bonded magnet that forms a plurality of magnetic poles, a cylindrical inner core provided inward of the bonded magnet, and a rotating shaft that is provided to pass through the inner core inward thereof. The inner core has both axial end surfaces exposed to outside. The rotating shaft includes a connecting end, which is fitted to the impeller. The connecting end has a pair of flat surfaces parallel to each other, and a cross section of the connecting end has a centroid coinciding with a rotational axis.

The centroid of the cross section of the connecting end of the rotating shaft coincides with the rotational axis, which prevents dynamic balance of the rotor from being lost due to the connecting end. It is therefore not necessary to provide the recess or the like to correct the dynamic balance at the end of the bonded magnet, and thus the bonded magnet can be made up only of the cylindrical portion. The bonded magnet including only the cylindrical portion has a small volume by the absence of the top plate and the bottom plate as compared with the existing magnet including the cylindrical portion, the top plate, and the bottom plate. It is therefore possible to decrease the volume of the bonded magnet while dynamic balance is prevented from being lost.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
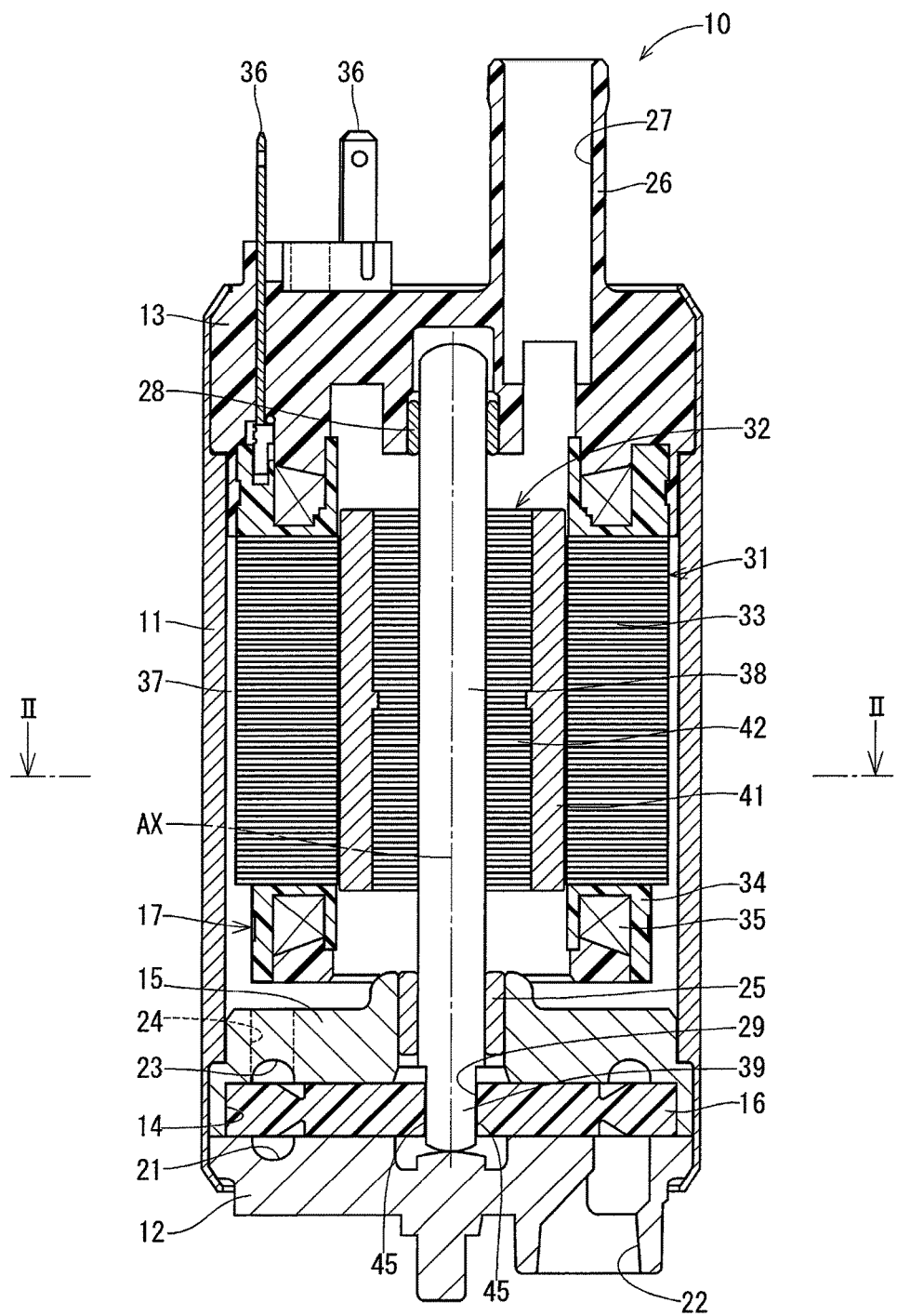
FIG. 1 is a longitudinal sectional view of a fuel pump using a rotor of a first embodiment.

Hereinafter, some embodiments are described with reference to drawings. Substantially the same configuration between the embodiments are designated by the same reference numeral, and duplicated description is omitted

First Embodiment

The fuel pump using a rotor of a first embodiment is an in-tank pump installed in a fuel tank of a vehicle, in which a fuel is drawn from a suction passage 22 shown in the lower side of FIG. 1 and pressurized, and discharged into an undepicted engine through a discharge passage 27 shown in the upper side of FIG. 1.

Figure 2:
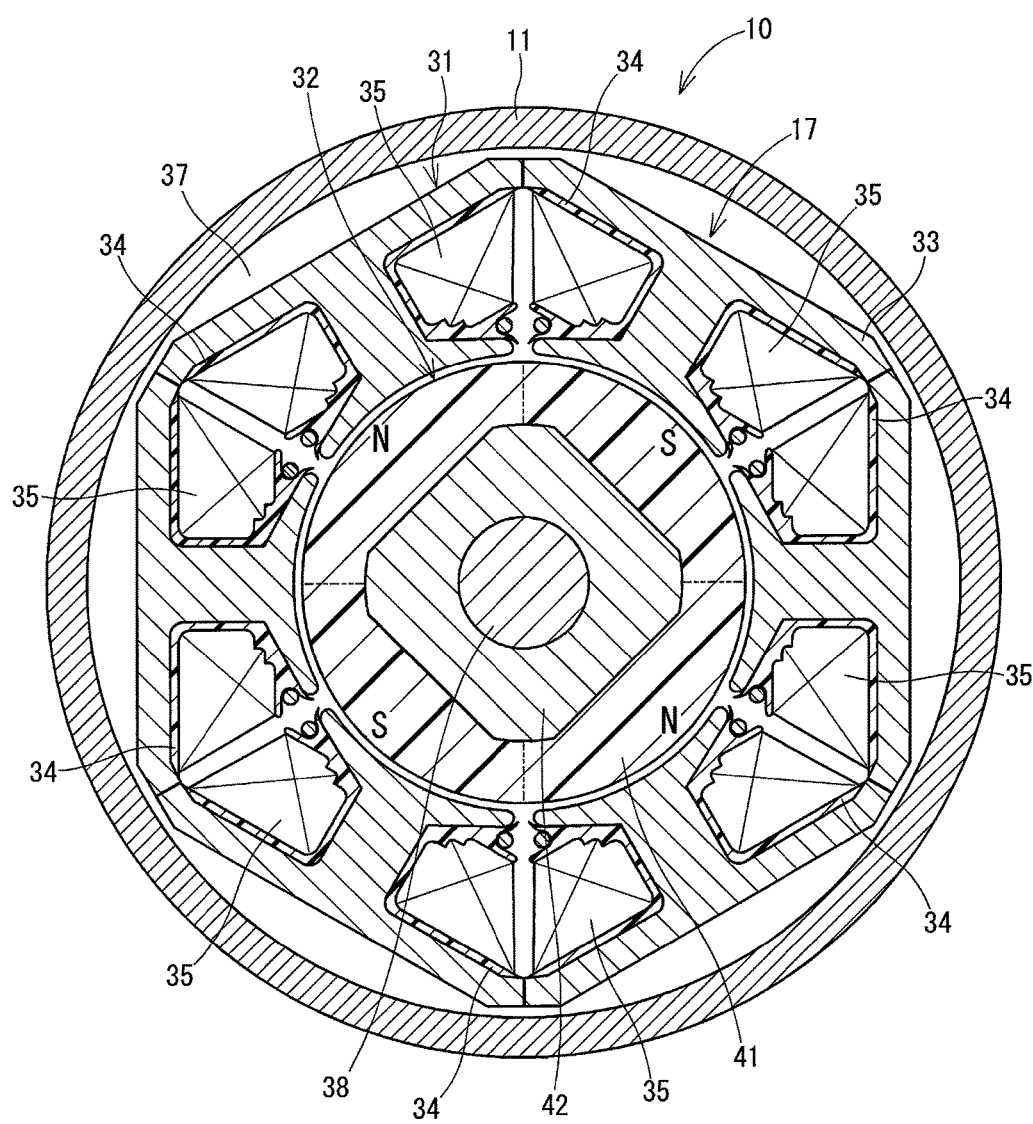
FIG. 2 is a sectional view along a line II-II in FIG. 1.
Figure 3:
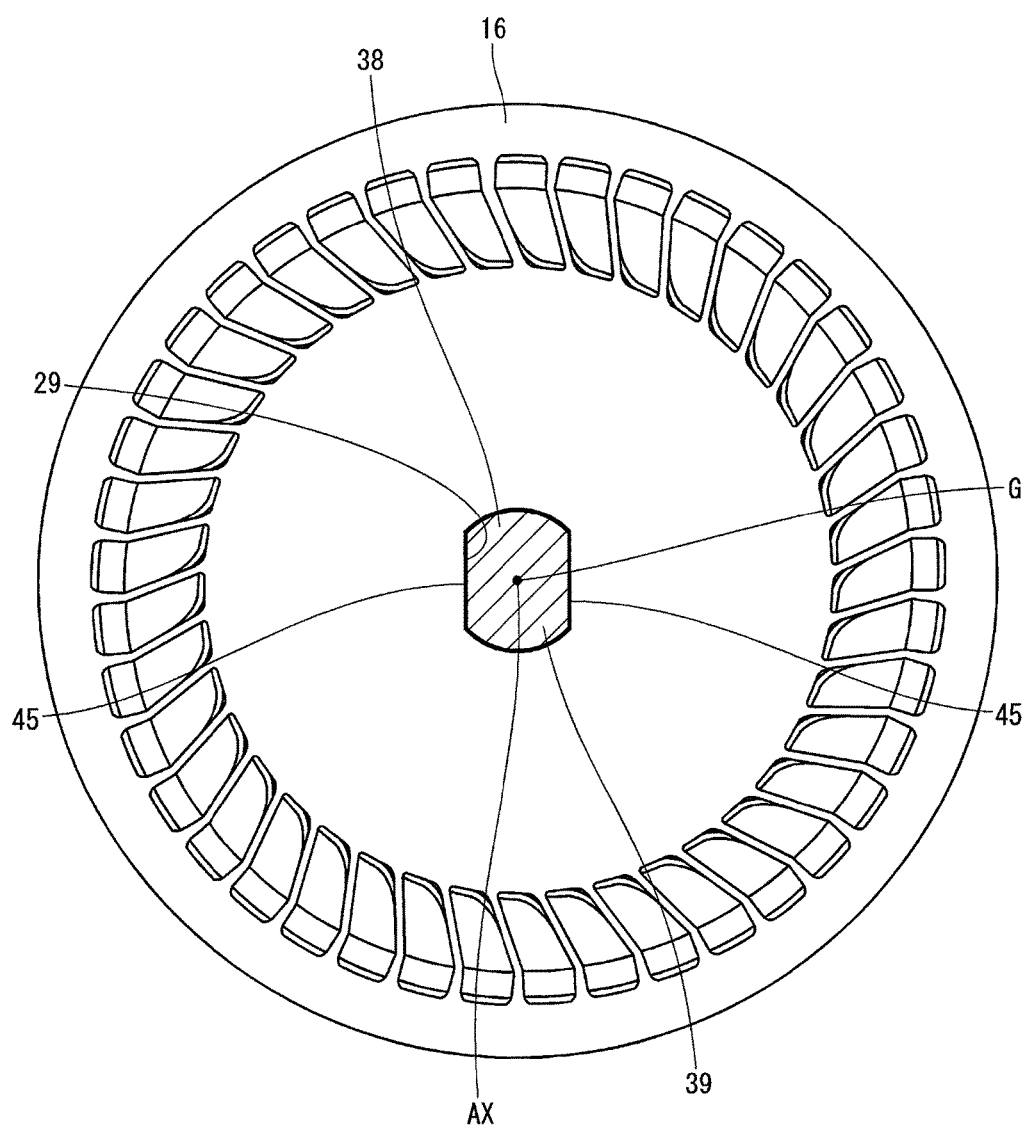
FIG. 3 illustrates an impeller in FIG. 1.
Figure 4:
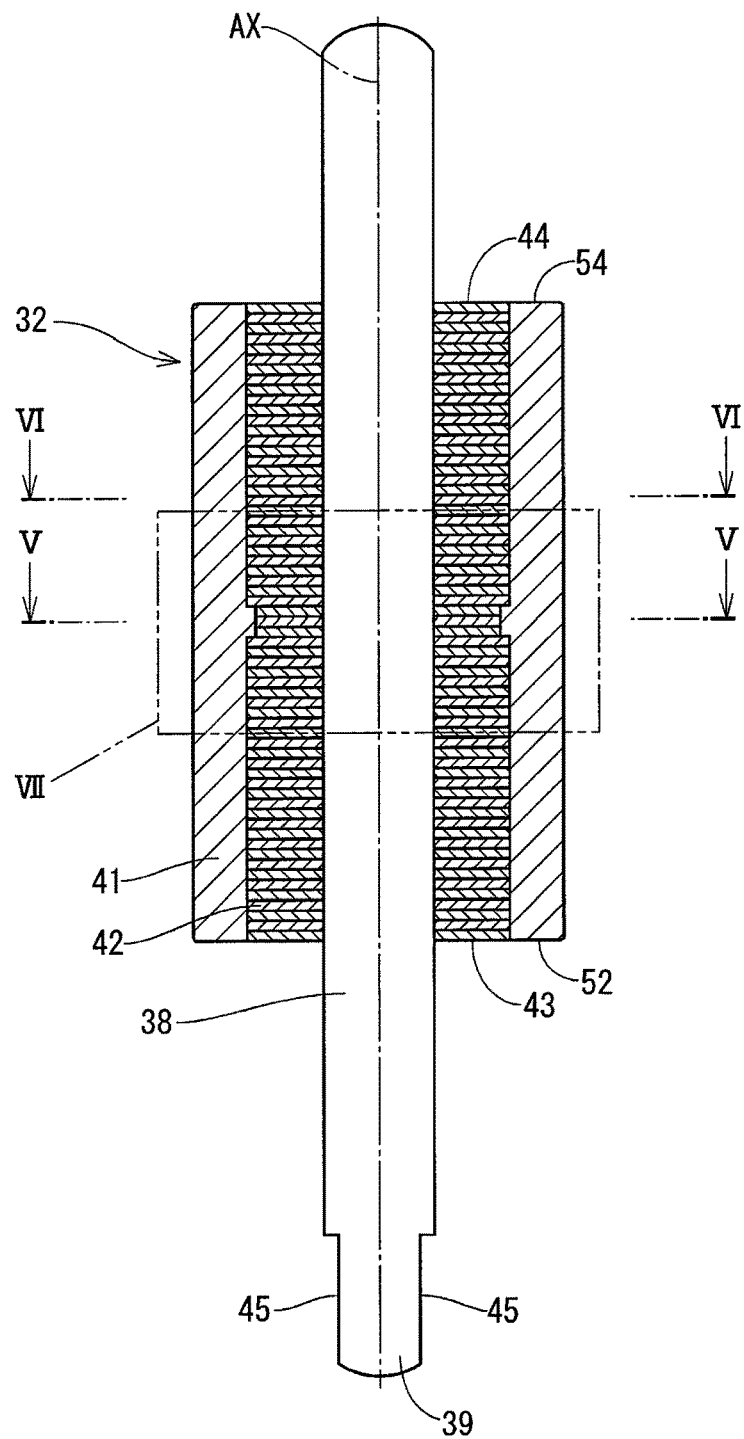
FIG. 4 illustrates the rotor in FIG. 1.

A configuration of a fuel pump 10 is now described with reference to FIGS. 1 to 3. The fuel pump 10 includes a cylindrical housing 11, a suction side cover 12 provided at one end of the housing 11, a discharge side cover 13 provided at the other end of the housing 11, a bottomed cylindrical casing 15 forming a pump chamber 14 between the casing 15 and the suction side cover 12 in the housing 11, an impeller 16 provided in the pump chamber 14, and a motor 17 provided in the housing 11 and rotationally driving the impeller 16.

The suction side cover 12 has a suction side pressurizing passage 21 and a suction passage 22. The suction side pressurizing passage 21 is provided in a wall opposed to the impeller 16 among inner walls defining the pump chamber 14. The suction side pressurizing passage 21 is a C-shaped groove extending in a circumferential direction. The suction passage 22 is provided so as to penetrate from the upstream end of the suction side pressurizing passage 21 to the outside.

The casing 15 has a discharge side pressurizing passage 23 and a discharge hole 24. The discharge side pressurizing passage 23 is provided in a wall opposed to the impeller 16 among the inner walls defining the pump chamber 14. The discharge side pressurizing passage 23 is a C-shaped groove extending in the circumferential direction. The discharge hole 24 is provided so as to penetrate from the downstream end of the discharge side pressurizing passage 23 to a motor 17 side. A bearing 25 is provided in the central portion of the casing 15.

The discharge side cover 13 forms a cylindrical portion 26 protruding to the outside. The cylindrical portion 26 has a discharge passage 27 penetrating from the inside of the housing 11 to the outside. A bearing 28 is provided in the central portion of the discharge side cover 13. The impeller 16 is a disk-shaped impeller. A fitting hole 29 is provided in the central portion of the impeller 16. The fitting hole 29 has the same cross-sectional shape as a connecting end 39 as described later and is slightly larger than the connecting end 39.

The motor 17 includes a stator 31 fixed to the housing 11 and a rotor 32 provided inside the stator 31. The stator 31 has a stator core 33, an insulator 34, a winding 35, and a terminal 36. A fuel passage 37 is defined between the housing 11 and the stator 31. The fuel passage 37 communicates with the discharge passage 27 through an undepicted fuel passage and the like. A rotating shaft 38 of the rotor 32 is rotatably supported by the bearings 25 and 28. The connecting end 39 of the rotating shaft 38 is fitted in the fitting hole 29 of the impeller 16. The rotating shaft 38 is connected to the impeller 16 in a rotationally transmissible manner.

In the fuel pump 10 configured as described above, when the motor 17 operates to rotate the impeller 16, fuel is sucked from, for example, a fuel tank into the pump chamber 14 through the suction passage 22. Fuel in the pump chamber 14 flows so as to spirally swirl between the impeller 16 and each of the pressurizing passages 21 and 23, and is pressurized from the suction passage 22 to the discharge hole 24. The pressurized fuel is discharged to the outside from the discharge passage 27 through the discharge hole 24, the fuel passage 37, and the like.

A configuration of the rotor 32 is now described in detail with reference to FIGS. 3 to 7. The rotor 32 includes a cylindrical bonded magnet 41 forming a plurality of magnetic poles, a cylindrical inner core 42 provided inside the bonded magnet 41, and the rotating shaft 38 provided so as to penetrate the inside of the inner core 42. The magnetic poles are provided such that the polarity on the radially outer side is alternately varied in the circumferential direction. A portion of the rotor 32 exposed to the internal space of the housing 11 is exposed to the fuel during operation of the fuel pump 10.

The bonded magnet 41 is made up only of a cylindrical portion, and does not cover both the end surfaces 43 and 44 of the inner core 42. Specifically, a first end surface 43 and a second end surface 44 of the inner core 42 are exposed to the outside. The connecting end 39 of the rotating shaft 38 has a cross section having a centroid G that coincides with the rotational axis AX, while having a pair of flat surfaces 45 parallel to each other.

The inner core 42 has recesses 46 recessed radially inward in a cross section parallel to the axial direction. The bonded magnet 41 has protrusions 47 that each protrude into the recess 46 and engage with the recess 46 in the axial direction. Engagement of the respective protrusions 47 with the recesses 46 suppresses disengagement of the bonded magnet 41 from the inner core 42. The recess 46 corresponds to "engaged part". The protrusion 47 corresponds to an "engaging part".

The recesses 46 are provided at a plurality of positions in the circumferential direction. In the first embodiment, the inner core 42 has a quadrilateral cross section. The recesses 46 are provided at four positions corresponding to the corners of the quadrilateral. The inner core 42 is made up of a plurality of metal plates stacked in the axial direction. The plurality of metal plates include first metal plates 48 forming the bottoms of the recesses 46 and second metal plates 49 provided on both sides in the axial direction with respect to the first metal plates 48. In other words, the inner core 42 is made up of a combination of a laminate of a plurality of second metal plates 49, a laminate of a plurality of first metal plates 48, and a laminate of a plurality of second metal plates 49.

Figure 5:
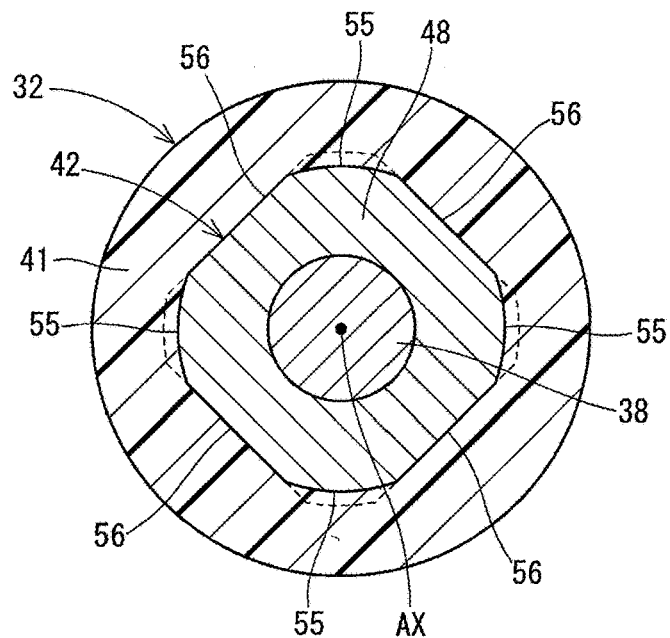
FIG. 5 is a sectional view along a line V-V in FIG. 4.

The first end surface 43 of the inner core 42 is on the same plane as a first end surface 52 of the bonded magnet 41. The second end surface 44 of the inner core 42 is on the same plane as a second end surface 54 of the bonded magnet 41. As illustrated in FIG. 5, the first metal plate 48 has four first outer wall surfaces 55 corresponding to the bottoms of the recesses 46 and four second outer wall surfaces 56 located between the first outer wall surfaces 55. In the first embodiment, each first outer wall surface 55 is a curved surface corresponding to a corner of the quadrilateral. Each second outer wall surface 56 is a plane corresponding to a side of the quadrilateral.

Figure 6:
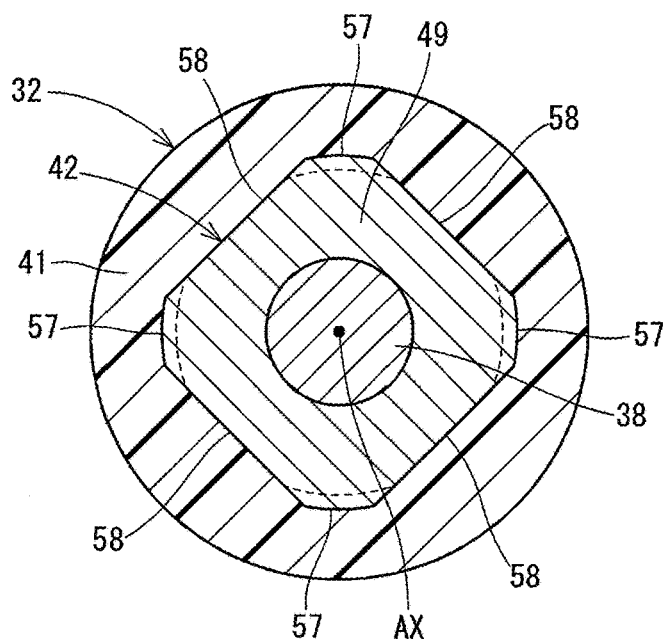
FIG. 6 is a sectional view along a line VI-VI in FIG. 4.
Figure 7:
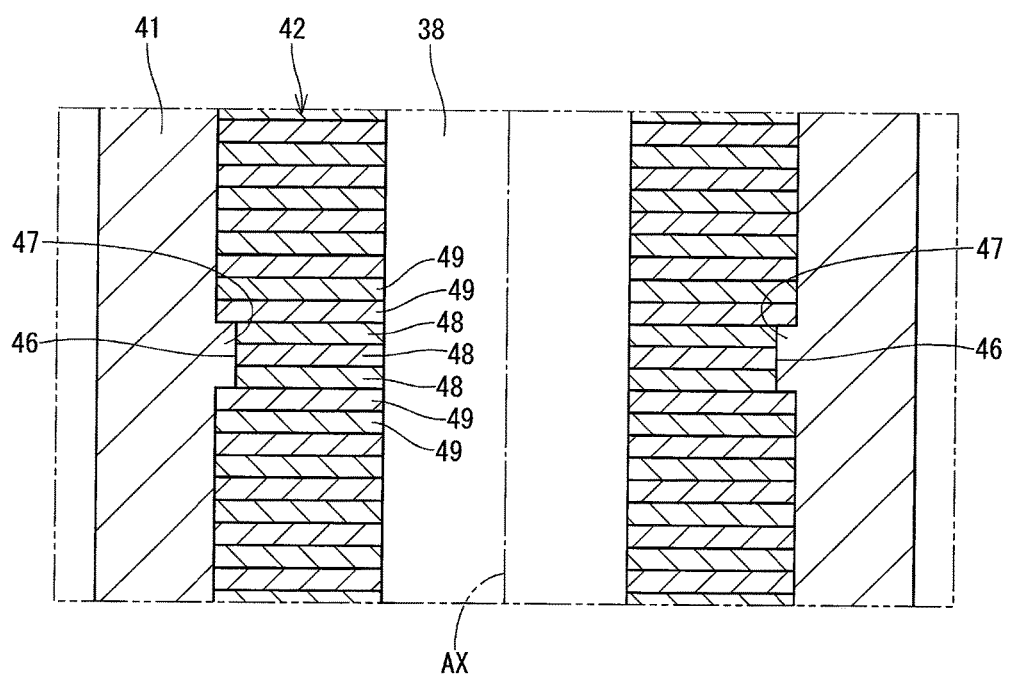
FIG. 7 is an enlarged view of a portion VII in FIG. 4.

As illustrated in FIG. 6, the second metal plate 49 has four third outer wall surfaces 57 located radially outward with respect to the first outer wall surfaces 55 and four fourth outer wall surfaces 58 that are each located on the same plane as a second outer wall surface 56. In the first embodiment, each third outer wall surface 57 is a curved surface corresponding to a corner of the quadrilateral. Each fourth outer wall surface 58 is a plane corresponding to a side of the quadrilateral. The second outer wall surfaces 56 are provided at equal intervals in the circumferential direction. Each second outer wall surface 56 and a fourth outer wall surface 58 on the same plane are used as a reference for press-fitting of the rotating shaft 38 into the stacked metal plates 48 and 49.

Effects of the first embodiment are now described. As described above, in the first embodiment, two end surfaces 43 and 44 in the axial direction of the inner core 42 are exposed to the outside. The rotating shaft 38 has the connecting end 39 to be fitted in the impeller 16. The connecting end 39 has the cross section having the centroid G that coincides with the rotational axis AX, while having the pair of flat surfaces 45 parallel to each other.

The centroid G of the cross section of the connecting end 39 of the rotating shaft 38 coincides with the rotational axis AX, which prevents dynamic balance of the rotor 32 from being lost due to the connecting end 39. It is therefore not necessary to provide a recess or the like to correct the dynamic balance at the end of the bonded magnet 41, and thus the bonded magnet 41 can be made up only of the cylindrical portion. The bonded magnet 41 including only the cylindrical portion has a small volume by the absence of the top plate and the bottom plate as compared with the existing magnet including the cylindrical portion, the top plate, and the bottom plate. It is therefore possible to decrease the volume of the bonded magnet 41 while the dynamic balance is prevented from being lost.

In the first embodiment, the inner core 42 has the recesses 46 recessed radially inward in the cross section parallel to the axial direction. The bonded magnet 41 has the protrusions 47 that each engage with the recess 46 in the axial direction. Hence, even if the bonding force between the bonded magnet 41 and the inner core 42 becomes weak, the engagement of the protrusions 47 with the recesses 46 can prevent the bonded magnet 41 from moving in the axial direction with respect to the inner core 42.

In the first embodiment, the recesses 46 are provided at the positions in the circumferential direction. The inner core 42 is made up of the plurality of metal plates stacked in the axial direction. The metal plates include the first metal plates 48 forming the bottoms of the recesses 46 and the second metal plates 49 provided on both sides in the axial direction with respect to the first metal plates 48. Each first metal plate 48 has a plurality of first outer wall surfaces 55 corresponding to the bottoms of the recesses 46 and a plurality of second outer wall surfaces 56 located between the first outer wall surfaces 55. Each second metal plate 49 has a plurality of third outer wall surfaces 57 located radially outward with respect to the first outer wall surfaces 55 and a plurality of fourth outer wall surfaces 58 that are each located on the same plane as a second outer wall surface 56. It is therefore possible to use the second outer wall surfaces 56 of the first metal plate 48 and the fourth outer wall surfaces 58 of the second metal plate 49 as a reference for press-fitting of the rotating shaft 38 into the stacked metal plates 48 and 49.

In the first embodiment, the number of the second outer wall surfaces 56 is four. The second outer wall surfaces 56 are provided at equal intervals in the circumferential direction. Hence, when the rotating shaft 38 is press-fitted into the stacked metal plates 48 and 49, movement of the first metal plate 48 can be reliably restricted by holding the four second outer wall surfaces 56.

In the first embodiment, the first end surface 43 of the inner core 42 is on the same plane as the first end surface 52 of the bonded magnet 41. The second end surface 44 of the inner core 42 is on the same plane as the second end surface 54 of the bonded magnet 41. It is therefore possible to prevent the fuel from infiltrating into the inside of the inner core 42, i.e., into a space between the metal plates, and thus suppress corrosion of the inner core 42.

Second Embodiment

Figure 8:
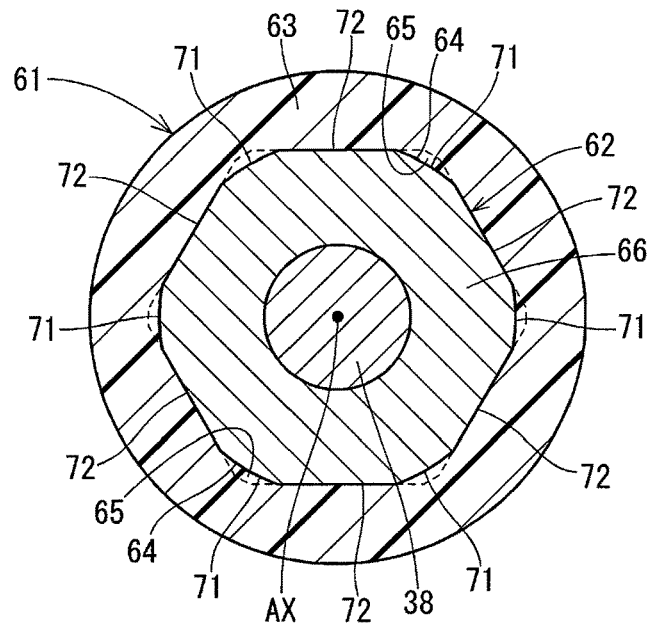
FIG. 8 is a cross-sectional view of a rotor of a second embodiment, corresponding to FIG. 5 in the first embodiment.
Figure 9:
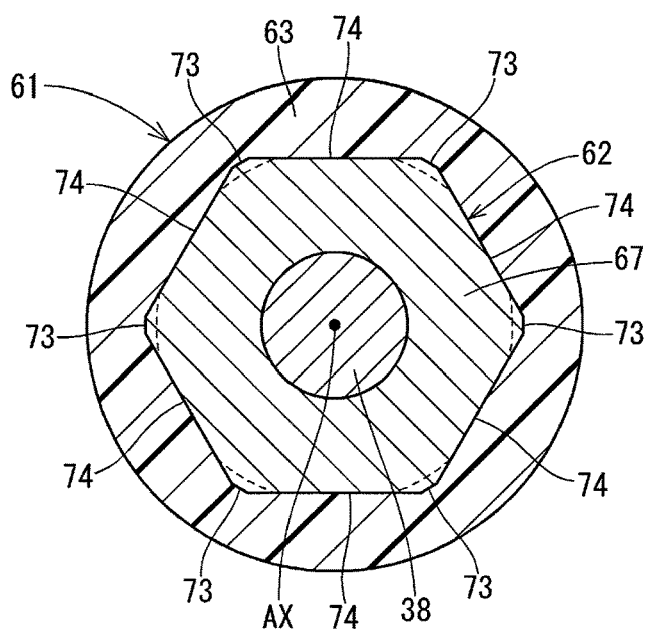
FIG. 9 is a cross-sectional view of the rotor of the second embodiment, corresponding to FIG. 6 in the first embodiment.

In a second embodiment, as illustrated in FIGS. 8 and 9, a rotor 61 includes a rotating shaft 38, an inner core 62, and a bonded magnet 63. The inner core 62 has recesses 64 and protrusions 65. In the second embodiment, the inner core 62 has a hexagonal cross section. The recesses 64 are provided at six positions corresponding to the corners of the hexagon. The inner core 62 is made up of first metal plates 66 forming the bottoms of the recesses 64 and second metal plates 67 provided on both sides in the axial direction with respect to the first metal plates 66.

As illustrated in FIG. 8, the first metal plate 66 has six first outer wall surfaces 71 corresponding to the bottoms of the recesses 64 and six second outer wall surfaces 72 located between the first outer wall surfaces 71. In the second embodiment, each first outer wall surface 71 corresponds to a corner of the hexagon. Each second outer wall surface 72 corresponds to a side of the hexagon.

As illustrated in FIG. 9, each second metal plate 67 has six third outer wall surfaces 73 located radially outward with respect to the first outer wall surfaces 71 and six fourth outer wall surfaces 74 that are each located on the same plane as a second outer wall surface 72. In the second embodiment, each third outer wall surface 73 corresponds to a corner of the hexagon. Each fourth outer wall surface 74 corresponds to a side of the hexagon.

The second outer wall surfaces 72 are provided at equal intervals in the circumferential direction. Each second outer wall surface 72 and a fourth outer wall surface 74 on the same plane are used as a reference for press-fitting of the rotating shaft 38 into the stacked metal plates 66 and 67. As described in the second embodiment, the inner core 62 may have a hexagonal cross-sectional shape. The cross-sectional shape of the inner core 62 can be appropriately varied in correspondence to the number of poles of the bonded magnet 63.

Modifications of the first or second embodiment are now described. In a modification, the engaged part of the inner core may be a protrusion protruding radially outward in a cross section parallel to the axial direction. In addition, the engaging part of the bonded magnet may be a recess recessed radially outward. In a modification, when the inner core has a polygonal cross section, the engaged part of the inner core may be provided at a position corresponding to a side of the polygonal. In a modification, the number of the engaged portions of the inner core should be two or more.

In a modification, the first outer wall surface of the first metal plate and the third outer wall surface of the second metal plate may each be a planar surface. In a modification, the second outer wall surface of the first metal plate may be a curved surface. In addition, the fourth outer wall surface of the second metal plate may be a curved surface located on the same curved surface as the second outer wall surface. In a modification, the second outer wall surfaces of the first metal plate may not be provided at equal intervals in the circumferential direction.

In a modification, the end surface of the inner core may not be on the same plane as the end surface of the bonded magnet. In a modification, the inner core may be made up not only of a laminate of a plurality of metal plates but also of a single component. The present disclosure is not limited to the above-described embodiments, and can be carried out in various modes within the scope without departing from the gist of the present disclosure.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A rotor used for a motor that rotates an impeller of a fuel pump, the rotor comprising:
    a cylindrical bonded magnet that forms a plurality of magnetic poles;

an inner core that is a cylindrical component provided inward of the bonded magnet and that has both axial end surfaces exposed to outside; and a rotating shaft that includes a connecting end, which has a pair of flat surfaces parallel to each other and is fitted to the impeller, and that is provided to pass through the inner core inward thereof, wherein a cross section of the connecting end has a centroid coinciding with a rotational axis, wherein:

the inner core includes an engaged part that is recessed radially inward or protrudes radially outward on a section parallel to an axial direction of the inner core;

the bonded magnet includes an engaging part that engages with the engaged part in the axial direction;

the engaged part is one of a plurality of engaged parts in a circumferential direction of the inner core;

the inner core includes a plurality of metal plates that are stacked in the axial direction; and the plurality of metal plates include:

first metal plates that form the engaged part, each of the first metal plates including:

a plurality of first outer wall surfaces which correspond to the plurality of engaged parts, respectively; and a plurality of second outer wall surfaces each of which is located between its adjacent two of the plurality of first outer wall surfaces; and second metal plates that are provided on both sides of the first metal plates in the axial direction, each of the second metal plates including:

a plurality of third outer wall surfaces which are located radially outward or radially inward of the plurality of first outer wall surfaces, respectively; and a plurality of fourth outer wall surfaces which are located on the same plane or on the same curved surface as the plurality of second outer wall surfaces, respectively.

2. The rotor according to claim 1, wherein:

a number of the plurality of second outer wall surfaces is three or more; and the plurality of second outer wall surfaces are provided at equal intervals in the circumferential direction.

3. The rotor according to claim 1, wherein:

one of the axial end surfaces of the inner core is on the same plane as one end surface of the bonded magnet; and the other one of the axial end surfaces of the inner core is on the same plane as the other end surface of the bonded magnet.

* * * * *